United States Patent [19]
Sattin

[11] Patent Number: 6,080,332
[45] Date of Patent: *Jun. 27, 2000

[54] PROCEDURE FOR THE ANTI-SCALER PRODUCTION FOR COATING THE POLYMERIZING REACTOR AND RESPECTIVE RESULTANT PRODUCT

[75] Inventor: Mario Sattin, Rovigo, Italy

[73] Assignee: C.I.R.S. S.p.A., Rovigo, Italy

[ * ] Notice: This patent is subject to a terminal disclaimer.

[21] Appl. No.: 08/973,362

[22] PCT Filed: May 31, 1996

[86] PCT No.: PCT/IT96/00111

§ 371 Date: Mar. 6, 1998

§ 102(e) Date: Mar. 6, 1998

[87] PCT Pub. No.: WO96/39445

PCT Pub. Date: Dec. 12, 1996

[30] Foreign Application Priority Data

Jun. 5, 1995 [IT] Italy ................................. UD95A0108

[51] Int. Cl.⁷ .............................. B01J 19/02; B05D 3/02; B05D 3/10
[52] U.S. Cl. ......................... 252/176; 252/178; 422/241; 525/328.8; 525/346; 526/62; 427/388.2
[58] Field of Search ..................................... 252/176, 178; 510/247; 525/194, 328.8, 346; 427/388.2; 422/131, 241; 526/62

[56] References Cited

U.S. PATENT DOCUMENTS

| | | |
|---|---|---|
| 2,597,281 | 5/1952 | Borstelmann et al. ..................... 8/617 |
| 3,617,167 | 11/1971 | Berth et al. .................................. 8/409 |
| 3,669,946 | 6/1972 | Koyanagi et al. .......................... 526/62 |
| 3,825,434 | 7/1974 | Berens et al. ............................. 422/241 |
| 4,068,059 | 1/1978 | Witenhafer ................................. 526/62 |
| 5,424,003 | 6/1995 | Shimizu et al. ........................... 526/62 |
| 5,508,361 | 4/1996 | Shimizu et al. ........................... 526/62 |
| 5,691,428 | 11/1997 | Shimizu et al. ........................... 526/62 |
| 5,888,589 | 3/1999 | Carlin et al. ............................. 427/444 |
| 5,965,094 | 10/1999 | Sattin ..................................... 422/241 |

FOREIGN PATENT DOCUMENTS

| | | |
|---|---|---|
| 0052421 | 5/1982 | European Pat. Off. . |
| 0598537 | 5/1994 | European Pat. Off. . |
| 5-230112 | 9/1993 | Japan . |

OTHER PUBLICATIONS

The Merck Index an Encyclopedia of Chemicalc, Drugs and Biologicals, Tenth Edition, (Merck & Co., Inc., Rahway, NJ, copyright 1983) p. 1235, entry 8454, Jan. 1984.

*Primary Examiner*—Richard D. Lovering
*Assistant Examiner*—Daniel S. Metzmaier
*Attorney, Agent, or Firm*—Finnegan, Henderson, Farabow, Garrett & Dunner, L.L.P.

[57] ABSTRACT

The invention comprises a novel process for producing an anti-scaler coating for monomer polymerization reactors comprising mixing hydroxymethansulphincal acid with 1-naphthol. The invention also comprises an anti-scaling product obtained by this novel process.

16 Claims, No Drawings

PROCEDURE FOR THE ANTI-SCALER PRODUCTION FOR COATING THE POLYMERIZING REACTOR AND RESPECTIVE RESULTANT PRODUCT

TECHNICAL FIELD

The object of this invention is a procedure for the anti-scaler production for coating the polymerizing reactors and respective product.

Anti-scaling agents for polymerizing reactors are already well known in prior art.

BACKGROUND ART

At the present state of the art there are also different types of anti-scalers for each type of polymer.

For example the anti-scaler for the production of vinyl chloride is not the same as that used in the reactor for the production of polystyrene or of that for the production of acrylic polymers, and so on.

This fact necessitates the stockage of different products with all the consequences of high management costs.

Additionally even the reactors must be specifically dedicated to only one reaction type, resulting in the increase of costs.

DISCLOSURE OF INVENTION

A first aim of this invention is that to make an anti-scaler that operates well in any type of polymerizing reactor and for the most varied types of different materials, therefore for polystyrene as well as for acrylic polymers, ABS, polybutadiene and PVC, etc.

In the specific case of polymerizing of vinyl chloride in suspension or emulsion for example, it is known that in the reactors a substantial deposit of scale forms having as main drawbacks:

- a consistent maintenance for the removing of the scaling with consequent interruption of the production, opening of the reactor and therefore high quantities of gaseous vinyl monomer chloride (VCM) emissions into the atmosphere;
- pollution of the resultant product as some of the scaling parts go into the respective polymerized product with consequent worsening in quality and complaints by the users;
- in definitive obstacles both in the productive system and in ecological problems for the areas in which the industrial polyvinylchloride plants (P.V.C.) operates.

This problem practically exists for all types of polymerizations.

Furthermore the anti-scaling products destined to coat the surfaces of the respective reactors are of a bluish colour or dark brown nearly black, wherefore the particles that detach from the crust, pollute the obtained polymer (for example obtained polyvinyl chloride) from the reactor under the form of black dots, that for example in the finished products worsens the qualitative aspect of the same product.

Furthermore it is to be noted that the material particles that detach from the crust of the wall, end up in the product in reaction, constituting the pollution of the same, dealing generally with toxic products.

In prior art, the technique of condensation or polycondensation of naphthols and phenol with an aldehydic cross-linking product (e.g. formaldehyde and others), to obtain anti-scaling products is known.

For this purpose one refers to:

U.S. Pat. No. 3,669,946 (filed in the U.S. on Aug. 31st, 1970, disclosed on Jun. 13th, 1972), that suggests the use of formaldehyde and ketonic composites, naphthol etc. and also alpha-naphthylamine and nigrosin. This teaching predivulges the general concept of forming condensate anti-scalers parting from the formaldehyde with phenols and naphthols derivatives.

U.S. Pat. No. 3,825,434 (Jul. 23rd 1974) describes an anti-scaling agent for the polymerizing of vinyl chloride, obtained from the condensation of the phenol with formaldehyde, where obviously for definition in this patent the obtained product is always classified as pertinent to the phenol-formaldehyde or polyarylphenol family.

U.S. Pat. No. 4,068,059 (filed on Feb. 17, 1977 published on the Oct. 1, 1978) explains furthermore the importance of using as anti-scalers, products that in their chemical structure contain one or more of the following groups: —OH; —COOH; SO3H and SO3Na. These groups are usually attached to an aromatic nucleus.

EP-A-0052421 describes a process for obtaining an anti-scaling product formed with formaldehyde that is made to react with 1-naphthol (alpha-naphthol), in which both the nuclear positions 2 and 4 are not replaced and the nuclear position 3 is not replaced or has a substitute that is not strongly eletron-attractor to obtain a condensate.

Even in this case the product obtained according to the chemistry is to be considered always as pertinent to the poliarylphenol family.

These last products have the drawback to supply, a dark brown or dark blue nearly black product, and not always being suitable for usages in sectors of polymerizing with different materials.

The reaction to produce this scale-preventing agent is difficult to control and leads to reticulate products insoluble in alkaline aqueous solution, the product being dark and constitutes clearly a pollutant of the polymer in reaction, when it is applied as anti-scale coating in the reactor wall.

Furthermore, the coating of the reactor with these anti-scalers is consumed easily dispersing itself in the material in reaction, polluting it by colour and by toxicity.

Furthermore we must point out that these anti-scalers are of poor efficacy, or however require a massive deposit of scale on the wall, such to preclude some usages, as for example, sanitary and alimentary, where the requested limits of polluting products in the finished product are decidedly lower etc.

To obtain a good anti-scale efficacy, they must however deposit on the wall in high quantities which also affects costs.

The colour of the anti-scalers of the known technique is dark and little appreciated by the user also because it makes one think of a pollutant product.

The dark colour of the product leads to a crust on the wall, also of dark colour (blackish) and this does not allow to see eventual application defects. But much more serious is that already mentioned, that during the reaction crust particles detach and mix with the polymer. As these crust parts are black it is clear that there is a qualitative worsening of the product.

Aim of the present invention is that to obviate the above-mentioned drawbacks and in particular to obviate the dark colour of the product and of the crust that it will form on the wall of the reactor.

The inventors originally thought of making an anti-scaling product that once applied onto the wall of the reactor is substantially colourless.

It is known that for whitening an aromatic product, for example colorants, hydrosulphite sodium or hydrosulphite potassium is used.

Attempts to make colourless with hydrosulphite the condensate formaldehyde and -1-naphthol have given negative results because the condensate result always remained bluish black tending to form deposits even if conserved in absence of oxygen, example presence of nitrogen.

In proceeding the research it was thought to avoid the reaction between formaldehyde and 1-naphthol in order to substitute it with a less toxic substance and able to form a colourless product.

After innumerable experimentations it is found that the best product to combine with 1-naphthol is hydroxymethanesulphinic acid.

The result was surprising and the product obtained was perfectly colourless.

In the anti-scaling tests in the reactors of polymerization of the products previously described astounding results were obtained both for performance, quality and yield.

The hydroxymethanesulphinic acid is identified with the following formula:

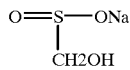

The best solution of the invention is reached by using the hydroxymethanesulphinic acid mixed with the 1-naphthol in the weight proportions of 1 to 1,5, in an aqueous solution of 10 to 40%, and bringing the temperature of the solution between 70° and 95° C. in a nitrogen atmosphere, alkaline environment (pH 11–13), a clear transparent coloured product is obtained, fully reaching the prefixed aim and without decreasing the quality of the product, infact improving it.

The product results physically of clear aspect, transparent, but if left in the presence of air for a certain period it oxidizes slightly verging towards a green blue colour.

The surprise however derives in that, if the contact with oxygen is interrupted, the product reverts to its original transparent clear aspect.

This physical behaviour proves that one has reached a completely new and structurally different product if compared to the products of prior art, where this physical phenomenon could not be observed.

From the chemical and spectroscopic analysis various hypothesis have been advanced on the structural nature of the product, and even not being entirely certain of the structure, one believes that the reversibility of the phenomenon could be tied to the presence in the product of a radical, that depending on the concentrations of oxygen could be more or less tied to the molecule structure of the primary compound.

In definitive according to the more probable deductions it should deal with an adducted bisulfite of the first product of the reaction that forms between 1-naphthol and hydroxymethanesulphinic acid.

The product applied onto the surface of the reactor in an atmosphere deprived of oxygen, after drying, results an opalescent white opaque colour, contrarily to the dark colour of the present anti-scalers.

The results have been therefore surprisingly good.

To maintain the transparent aspect of the liquid product before the application onto the wall, according to the present invention it is conserved in containers impermeable to oxygen.

Advantageously it was discovered that the best conservation is by means of pressurization of the container with neuter gas, preferably nitrogen.

Just as advantageous it was discovered that the most effective containers are of glass or better still of polyethyleneterphtalar "PET" (in such a way the containers do not pollute and are fully recyclable).

With the use of the container in "PET" (flexible container), another important physical behaviour was discovered:

when a litre bottle, for example, of the product is opened according to the present invention closed down tightly and that, given the transparency it is visible transparent, leaving the bottle open for a few minutes to the air, the contained product becomes dark;

closing the bottle again after the product has become dark, it is noted that the bottle in flexible "PET", withdraws slightly. This could be justified in that the product destroys all the oxygen which has remained in the air which is contained in the bottle previously open and now closed.

furthermore the product returns to a clear transparent colour as before, as if nothing had happened.

This proves that the product auto-protects itself or it auto-reconstitutes in its original aspect, with the condition however that it is kept away from air contact.

The product conserved as such remains therefore unaltered, of clear colour, and in the experimentation of application onto the wall of the reactor (obviously in the presence of inert gas), the anti-scaler is deposited onto the wall as a thin stratum becoming as mentioned above, colourless and transparent.

Advantageously it was discovered that the application onto the wall of the reactor must be made not only in absence of oxygen but also by means of a water vapour spray at high temperature.

Spraying the product with water vapour at high temperature the maximum adherency result is obtained.

As the reaction of polymerizing in reactor lasts on average from four to six hours it is evident that in this time and in absence of oxygen, there are no substantial degradations of the product, and consequently colorimetric degradations, therefore once the reaction of polymerizing is completed and once the smallest anti-scaling percent is integrated in the polymerized mass, this will not undergo further important contaminations and degradations.

Instead, in prior art using the anti-scaling products previously known, one had to fully wash and empty the reactor from any minimum trace of the residue of the product applied onto the wall as an anti-scaler, with this new product, it is possible to send the rinse of the reactor to the tank collection of the aqueous suspensions of the polymer obtained without requiring further refuse discharges, realizing in this way a complete and effective and above all economic technology of the loading and unloading of reactors of polymerization with the technique named by the experts of the sector as man hole closed.

As the hydroxymethanesulphinic acid may be also used with a molar hydrosulphite excess, even using this product a condensate of analogous or improved performance (largely reducing conditions) is obtained.

As both in this case and that of the preceding, the activity of the product is always given from the presence of bisulphate derivatives and in particular of bisulphite radicals present in the derivative, this characteristic clearly distinguishes the new product from the prior art, and in particular with reference to the resulting structure of the derived product, this identifies as innovator for the presence of a carbon atom interposed between the aromatic rings and tied to a sulphonic group.

It is also proved that in place of the 1-naphthol other naphthols can be used with more or less similar results.

What is claimed is:

1. A process for anti-scaler production for coating monomer polymerization reactors, wherein said anti-scaling product is obtained by the reaction between the sodium salt of hydroxymethanesulphinic acid with naphthol, comprising mixing hydroxymethanesulphinic acid with the 1-naphthol in weight proportions of 1 to 1.5, in an aqueous solution of 10 to 40%, and bringing the temperature of the solution between 70° and 95° C. in a nitrogen atmosphere and alkaline environment of pH 11–13, in order to obtain a clear transparent product, the process being carried out in such a way that the resulting product is clearly transparent in absence of the oxygen contact.

2. A process for anti-scaler production for coating polymerization reactors according to claim 1, further comprising adding sodium hydrosulphite into the reaction.

3. A process for anti-scaler production for coating polymerization reactors according to claim 2, wherein a molar excess of sodium hydrosulphite in relation to said hydroxymethanesulphinic acid is added to the product to prevent the evolution of an adducted bisulphite of a first product of the reaction between 1-naphthol and hydroxymethanesulphinic acid.

4. A process for anti-scaler production for coating polymerization reactors according to claim 1, further comprising adding potassium hydrosulphite into the reaction.

5. A process for anti-scaler production for coating polymerization reactors according to claim 4, wherein a molar excess of potassium hydrosulphite in relation to said hydroxymethanesulphinic acid is added to the product to prevent the evolution of an adducted bisulphite of a first product of the reaction between 1-naphthol and hydroxymethanesulphinic acid.

6. A process for anti-scaler production for coating polymerization reactors according to claim 1, further comprising adding a molar excess of hydrosulphite in relation to said hydroxymethanesulphinic acid into the reaction to prevent the evolution of an adducted bisulphite of a first product of the reaction between 1-naphthol and hydroxymethanesulphinic acid.

7. A process for anti-scaler production for coating polymerization reactors according to claim 1, wherein the obtained product is conserved in containers impermeable to oxygen.

8. A process for anti-scaler production for coating polymerization reactors according to claim 1, wherein the obtained product is conserved in containers impermeable to oxygen by means of pressurization in inert gas.

9. A process for anti-scaler production for coating polymerization reactors according to claim 1, wherein the obtained product is conserved in containers impermeable to oxygen by means of pressurization in nitrogen.

10. A process for anti-scaler production for coating polymerization reactors according to claim 1, wherein the obtained product is conserved in containers impermeable to oxygen by means of pressurization in nitrogen by using containers of polyethyleneterephthalate (PET).

11. A process for anti-scaler production for coating polymerization reactors according to claim 1, wherein the obtained product is conserved in containers impermeable to oxygen by means of pressurization in nitrogen by using transparent containers of polyethyleneterephthalate (PET).

12. An anti-scaling product in the form of liquid to be applied onto the walls of a polymerization reactor, obtained according to the process of claim 1, wherein the anti-scaling product is realized by means of reaction between the sodium salt of hydroxymethanesulphinic acid and naphthol, wherein the product contains bisulphite radicals, hydrosulphite or mixtures thereof, and wherein in absence of oxygen, the product is a clear transparent color, and in the presence of oxygen, the product becomes of greenish-blue color or dark; and if contact of the product with oxygen is interrupted, the product reverts to its original aspect.

13. An anti-scaling product in liquid form, to be applied onto the walls of a polymerizing reactor, obtained according to the process of claim 1, wherein said anti-scaling product is realized by reaction between the sodium salt of the hydroxymethanesulphinic acid with 1-naphthol.

14. An anti-scaling product in the form of liquid to be applied onto the walls of a polymerization reactor, obtained according to the process of claim 2, wherein the anti-scaling product is realized by means of reaction between the sodium salt of hydroxymethanesulphinic acid and naphthol, wherein the product contains bisulphite radicals and sodium hydrosulphite, and wherein in absence of oxygen, the product is a clear transparent color, and in the presence of oxygen, the product becomes of greenish-blue color or dark; and if contact of the product with oxygen is interrupted, the product reverts to its original aspect.

15. An anti-scaling product in the form of liquid to be applied onto the walls of a polymerization reactor, obtained according to the process of claim 4, wherein the anti-scaling product is realized by means of reaction between the sodium salt of hydroxymethanesulphinic acid and naphthol, wherein the product contains bisulphite radicals and potassium hydrosulphite, and wherein in absence of oxygen, the product is a clear transparent color, and in the presence of oxygen, the product becomes of greenish-blue color or dark; and if contact of the product with oxygen is interrupted, the product reverts to its original aspect.

16. An anti-scaling product in the form of liquid to be applied onto the walls of a polymerization reactor, obtained according to the process of claim 6, wherein the anti-scaling product is realized by means of reaction between the sodium salt of hydroxymethanesulphinic acid and naphthol, wherein the product contains bisulphite radicals and hydrosulphite, and wherein in absence of oxygen, the product is a clear transparent color, and in the presence of oxygen, the product becomes of greenish-blue color or dark; and if contact of the product with oxygen is interrupted, the product reverts to its original aspect.

* * * * *